United States Patent [19]

Biola et al.

[11] 4,206,148

[45] Jun. 3, 1980

[54] PROCESS FOR THE DEHALOGENATION OF HALOGEN-CONTAINING AROMATIC COMPOUNDS

[75] Inventors: Georges Biola, Bron; Jean Font, Fontaines S/S; Jean C. Daumas, Orsay, all of France

[73] Assignee: Philagro, Lyons, France

[21] Appl. No.: 941,845

[22] Filed: Sep. 12, 1978

[30] Foreign Application Priority Data

Sep. 22, 1977 [FR] France .................. 77 29400

[51] Int. Cl.$^2$ .................. C07C 85/24; C07C 85/11
[52] U.S. Cl. .................. 260/578; 252/463; 252/465; 252/466 J; 260/580
[58] Field of Search .............. 260/578, 580; 252/463, 252/465, 466 J

[56] References Cited

U.S. PATENT DOCUMENTS

| | | | |
|---|---|---|---|
| 3,148,217 | 9/1964 | Freyermuth et al. | 260/580 |
| 3,839,193 | 10/1974 | Hayes | 252/441 X |
| 3,867,312 | 2/1975 | Stephens | 252/462 |
| 3,888,929 | 6/1975 | Rivier | 260/578 |
| 3,912,782 | 10/1975 | Kiel et al. | 260/570.9 X |
| 3,912,783 | 10/1975 | Wedemeyer et al. | 260/370.9 X |
| 4,022,795 | 5/1977 | Bamfield et al. | 260/578 |
| 4,085,141 | 4/1978 | Wedemeyer et al. | 260/578 |
| 4,100,109 | 7/1978 | Muller | 252/465 |

*Primary Examiner*—John Doll
*Attorney, Agent, or Firm*—Browdy and Neimark

[57] ABSTRACT

A process for the dehalogenation of halogen-containing aromatic compounds takes place in the vapor phase, at a temperature of between 280° and 420° C., by the action of hydrogen in the presence of a controlled-action hydrogenation catalyst deposited on an alumina-based support wherein the support used is modified, at least on the surface, by the incorporation of a metal in the form of a salt or an oxide, this incorporation consisting in treating the support with the said metal salt or metal oxide and then carrying out a calcination at a temperature ranging from about 500° to 1,000° C.

16 Claims, No Drawings

PROCESS FOR THE DEHALOGENATION OF HALOGEN-CONTAINING AROMATIC COMPOUNDS

The present invention relates to a process for the manufacture of halogen-containing aromatic compounds by dehalogenating corresponding derivatives which carry a larger number of halogen atoms. It relates more especially to the manufacture of meta-substituted chloroanilines, in particular 3,5-dichloroaniline, from anilines which contain a larger number of chlorine atoms.

BACKGROUND OF THE INVENTION

It is known that 3,5-dichloroaniline can be obtained, according to French Application No. 2,162,782, by a process for the dehalogenation of halogen-containing aromatic compounds which leads to the preferential production of deivatives carrying a smaller number of halogen atoms, at least one of which is located in the meta position relative to a functional group, in the vapour phase, by the action of hydrogen and in the presence of fixed-bed or fluid-bed catalysts, which is characterised in that aromatic amines containing several halogen atoms, or the corresponding nitro derivatives, ar brought into contact with hydrogen at a temperature of between 280° and 420° C., in the presence of a controlled-action hydrogenation catalyst such as a salt (chloride, oxide, nitrate, sulphate or chromite) of copper or of silver.

This process is characterised by its improved selectivity with respect to aromatic derivatives which are substituted in the meta position. However, experiment shows that, in particular when employing copper compounds on an alumina support, the process exhibits the major disadvantage that it requires frequent regeneration of the catalyst as a result of the formation in situ of carbon deposits due to the complete degradation of a little part of the starting derivatives.

DISCLOSURE OF THE INVENTION

It has now found that these carbon deposits can be considerably reduced by modifying at least part of the support, including its surface. For greater convenience, this modification will hereafter be denoted as "surface" modification, it being understood that this designation does not imply a limitation, the main point being that the modification involves at least the surface.

The present invention therefore relates to a process for the dehalogenation of halogen-containing amino or nitro aromatic compounds which leads to the preferential production of derivatives carrying a smaller number of halogen atoms, at least one of which is substituted in the meta position relative to the amino or nitro group, in the vapour phase and at a temperature of between 280° and 420° C., by the action of hydrogen in the presence of a controlled-action hydrogenation catalyst deposited on an alumina-based support, wherein the support used is modified, at least on the surface, by the incorporation of a metal in the form of a salt or an oxide, this incorporation consisting in treating the support with the said metal salt or metal oxide and then carrying out a calcination at a temperature ranging from about 500° to 1,000° C.

This support, modified in this way, contains from 0.2 to 30%, and preferably from 5 to 20% by weight of incorporated metal, relative to the initial support.

The support which can be used according to the invention is usually in the form of silica grains having a fine particle size, that is to say having a mean diameter ranging from about 60 to 200, and preferably from about 80 to 100, microns, in the case of fluid beds, or having a larger particle size, of the order of a few mm, in the case of fixed beds. The specific surface area of the grains is generally between about 20 and 500 $m^2/g$ and is preferably 60 to 300 $m^2/g$.

The first stage of the incorporation of the metal into the support can be carried out in accordance with several variants.

The first variant consists in impregnating the support with a solution of an alkali metal salt, an alkaline earth metal salt or a polyvalent metal salt. This technique is particularly suitable for alumina-based supports, the alumina combining with the impregnating salt, after calcination, to give either aluminates or alumina/metal oxide solid solutions. In addition to alkali metal and alkaline earth metal salts, salts of iron, nickel, cobalt, zinc and copper, and also of chromium, molybdenum or tungsten, can also be used advantageously. Using this technique, good results have been obtained with magnesium salts, copper salts and chromium oxide.

The second variant consists in incorporating the metal, in accordance with a sol-gel technique, by mixing a salt of the metal with an aluminum salt, gelling the resulting compound by neutralisation with hexamethylenetetramine, and dispersing it as fine droplets in a hot hydrocarbon, these droplets assuming a spherical shape.

The term "alumina sol" is to be understood as meaning, in particular, any basic aluminium salt of the general formula $Al_2(OH)_{6-a}X_a$ in which X is at least one anion chosen from amongst the group comprising halogens $NO_3^-$ and $ClO_4^-$; aluminum hydroxychlorides will be preferred. These basic aluminium salts can be obtained, in particular, by digesting aluminium metal in the acid HX or in a solution of $AlX_3$, by electrolysing a solution of the aluminium salt, by neutralising a more or less basic aluminium salt with a base and removing the salt formed, by reacting an aluminium salt with an electron donor, such as ethylene oxide, and removing the reaction product, by bringing an aluminium salt into contact with a water-immiscible solvent, containing a long-chain aliphatic amine, and then recovering the aqueous phase containing the basic salt and concentrating it, by peptising a freshly precipitated alumina gel or by attacking an aluminium oxide or hydroxide with the acid HX.

The alumina sol solution contains from 5 to 35% by weight of alumina, calculated as $Al_2O_3$, and possesses an atomic ratio of Al/X of between 1.33 and 2.67. According to a preferred embodiment, the concentration of alumina in the initial sol solution is between 15 and 30% by weight and the atomic ratio of Al/X is between 1.60 and 2.20.

The concentration of the hexamethylenetetramine solution used according to the invention is between 15 and 45% by weight; according to a preferred embodiment, it is from about 30 to 45% by weight.

The hexamethylenetetramine solution is intimately mixed with the alumina sol solution at a lower temperature than the gelling temperature of the mixture. The solutions are mixed in volume ratios of hexamethylenetetramine solution/alumina sol solution of about 3:1 and 1:20, the value of this ratio depending, in particular, on the alumina concentration and the value of the atomic ratio of Al/X in the initial sol; it can be advantageous to mix the solutions in proportions such that these volume ratios are between 1:1 and 1:6.

The resulting mixture is then dispersed, in the form of droplets, in a very sparingly water-miscible liquid. Any very sparingly water-miscible liquid or mixture of liquids, having a lower density than that of the droplets, can be used as the shaping liquid. Examples of very sparingly water-miscible liquids which may be mentioned are: petroleum, kerosene, dodecylbenzene, alcohols and organic solvents in general.

The droplets of mixture gel due to the neutralisation of the anions contained in the initial sol by the ammonia liberated during the hydrolysis of the hexamethylenetetramine. According to the invention, in order to obtain a suitable gelling of the droplets, the aluminium concentration in the mixture is advantageously between 6 and 12% by weight, and preferably between 7 and 11%, the molar ratio of hexamethylenetetramine/chlorine is moreover advantageously greater than 0.17, and preferably between 0.2 and 0.6, the temperature of the shaping liquid is advantageously between 50° and 105° C., and preferably between 85° and 95° C., and the residence time in the shaping medium is advantageously between about 1 second and 2 hours.

After this shaping stage, the beads obtained are aged in the same type of very sparingly water-miscible medium as the shaping medium. This ageing is carried out at a temperature below 130° C., and preferably between 100° and 110° C., and under a pressure which is greater than atmospheric pressure and at which the water contained in the spheres of gel is kept in the liquid state. This ageing can advantageously be carried out at a temperature of between 120° and 150° C. and for a period of 10 to 30 hours, and preferably 16 to 24 hours.

This technique is particularly suitable for incorporating chromium oxide into alumina supports. After calcination, microbeads are obtained which, relative to the alumina support into which chromium oxide was incorporated in accordance with the first variant, that is to say by impregnation, possess the advantage of a more homogeneous appearance and a greater mechanical strength with a consequent enhancement of the performance and the durability of the catalyst system.

Of course, whether the support has been treated in accordance with the first or the second variant, the treated support is then calcined at a temperature ranging from 500° to 1,000° C., and preferably from 800° to 1,000° C.

The support, modified in this way, is then impregnated, in a manner which is in itself known, with a salt (chloride, sulphate, nitrate or chromite) or an oxide of a metal having the properties of a controlled-action hydrogenation catalyst, such as, for example, silver and preferably copper, but other hydrogenation catalysts or combinations of hydrogenation catalysts of comparable efficiency to a salt of the abovementioned metals can also be envisaged.

The other general conditions for carrying out the process according to the invention are as follows:

The starting materials are obviously chosen depending on the final products desired, in the sense that an aromatic compound carrying one or two halogen atoms in the meta position is taken if it is desired to preferentially manufacture a product possessing this (these) substituent(s). The presence of at least one halogen atom in the ortho position is necessary if it is intended to manufacture meta- and ortho-substituted amines, although, according to a characteristic of the invention, it is also possible, if desired, to totally omit the ortho substituents. The choice of the starting material is not subject to any other requirements, that is to say that, taking these prerequisites into account, it is possible to employ derivatives in which the nucleus is either totally or partially substituted by halogen atoms. Moreover, one of the advantages of the process lies in the fact that it makes it possible to utilise certain compounds containing several halogen atoms, in particular chlorine atoms, which do not in themselves have an extensive application; thus, for example, certain isomers of tri- and tetrachlorobenzenes, which are rarely used and have a low cost price, can be converted into tri- and tetrachloroanilines which make it possible, in accordance with the process of the invention, to obtain a compound such as 3,5-dichloroaniline; the latter is thus manufactured under conditions which are economically much more advantageous than in the case where it is prepared in accordance with the method known hitherto. A further interesting example relates to certain dichloroanilines in which one of the chlorines is in the meta position, in particular 3,4-dichloroaniline, and which can be converted into 3-chloroaniline in better yield. Analogous cases of the ultilisation of aromatic compounds containing several bromine atoms can also be found. Finally, it is not necessary for the starting product to be pure; in the process of the invention, it is possible to employ a charge comprising a major proportion of the compound chosen for the reaction, in addition to polyhalogenoamines containing different numbers of halogen atoms, or even by-products. It is also possible to use mixtures of two or more compounds intended for the reaction.

The temperature is a fairly important factor and must be kept within the range of 280° to 420° C., if it is desired to operate in the gas phase of the initial halogen-containing aromatic derivatives and obtain the desired selectivity and a suitable degree of conversion, without the formation of substantial amounts of undesirable products, especially by degradation and cracking. Within these limits, the temperature range which is more especially suitable is a function of diverse variables. Firstly, silver-based catalysts generally require a relatively high range, of the order of 350° to 420° C., whereas copper-based catalysts also enable the lower temperature range to be used, within the limits of the invention. It is also possible to vary this factor in order to modify the relative proportions of the final products. Thus, if it is desired to increase the relative amount of the 3-halogeno- and/or 3,5-dihalogenoaniline formed, relative to the 2,3,5-trihalogenoaniline, it is preferred to adopt a slightly higher temperature than in the case where this effect is not desired. The same shift can be found again when using a starting material which has a higher or lower degree of halogenation. Since the reaction is strongly exothermic, it is recommended to remove the heat in order to keep the reaction mixture at an essentially constant temperature; to do this, the conventional means are employed, such as cooling with the aid of heat-transfer fluids, or other means. In this respect, the application of the fluid-bed technique is of value because it avoids local overheating.

The amount of hydrogen to be employed in the process of the invention does not constitute a determining factor and can represent, as desired, the stoichiometric proportion, relative to the number of halogen atoms to be removed, or preferably a small or large excess. The reaction takes place easily, is very rapid, at most of the order of a few seconds or even fractions of a second, and is perfectly suited to atmospheric pressure, although the application of a lower or higher pressure is obviously not excluded.

According to an optional but particularly advantageous characteristic of the process of the invention, the initial aromatic amines, containing several halogen atoms, can be prepared in situ by introducing, into the dehalogenation zone, the aromatic nitro compounds, containing several halogen atoms, which are used to obtain the said amines; the conversion of the nitro derivatives into anilines is very high or even quantitative. Thus, it is possible to manufacture the desired amines, containing relatively few halogen atoms, in a single stage directly from nitro compounds carrying a larger number of halogen atoms. An example of such a method of operation is, in particular, the manufacture of 3,5-dichloroaniline starting from 1-nitro-2,3,4,5-tetrachloro- or 1-nitro-2,3,5,6-tetrachloro-benzene or from pentachloronitrobenzene.

In practice, a convenient means for carrying out the process according to the invention consists in introducing hydrogen and the halogen-containing starting material, which has been vaporised beforehand, through the bottom of a reaction zone which contains a catalyst bed consisting of support particles on which the catalyst is deposited, and which has been brought to the reaction temperature which is kept essentially constant. By suitably adjusting the rate of introduction of the gases, it is possible to keep the catalyst bed in the fluid state. Advantageously, the products formed are rapidly removed from the dehalogenation zone in order to avoid secondary reactions and degradation phenomena. At the outlet of the reactor, the gaseous effluent contains the hydrogen halide gas formed during the reaction, generally some hydrogen and some unconverted starting material, and the aromatic compounds resulting from the dehalogenation, the major proportion of which is represented by derivatives carrying a halogen in the meta position, whereas the remainder comprises various halogen-containing isomers and, possibly, a small proportion of a product containing no halogen atoms, and various impurities; these amines are at least partially present in the form of hydrogen halide salts. This mixture is treated by applying various techniques, for the purpose of separating it into its constituents. An advantageous means consists in initially bringing the gaseous effluent, produced by the reaction, into contact with a liquid or vapour, such as an aliphatic alcohol like methanol, a hydrocarbon like benzene, or water, which is at a substantially lower temperature than the said effluent, for example at 100° C. or below, depending on the compound employed, in order to rapidly condense the anilines and/or their hydrogen halide salts. The various amino compounds are then separated, for example by crystallisation. The amines can be recovered in the free form, if necessary, by applying the conventional methods such as treatment with a basic compound like sodium hydroxide, potassium hydroxide, an alkali metal carbonate or the like. It is also possible firstly to liberate the amines and then to separate them by crystallisation or distillation. If water is used in this technique, additional advantage is taken of the fact that some hydrogen halide salts of amines are insoluble in an aqueous medium, whereas others are soluble. Thus, for example, tri- and tetra-chloroaniline hydrochlorides are virtually insoluble, whereas mono- and di-chloroaniline hydrochlorides are soluble. An aqueous solution is then collected, in which the hydrogen halide gas and some hydrogen halide salts of anilines are dissolved and which contains the insoluble hydrogen halide salts in suspension or in the form of precipitates. Separation of the soluble products from the insoluble products is then achieved by means of a simple physical or mechanical operation such as filtration or centrifugation. The solid phase and the solution are then treated separately, as indicated above, in order to isolate the amino compounds.

If necessary, the initial unconverted amine or halogenoamines which have been produced by the reaction but were not particularly desired, for example derivatives containing three halogen atoms in the case of a process intended for manufacturing essentially derivatives containing two halogen atoms, can advantageously be recycled, in whole or in part, into the reaction zone where they are resubjected to the dehalogenation process according to the invention. They can be recycled either with the hydrogen halide salts or with the free amines.

It is clear that the scope of the invention does not exclude adopting a practical method for carrying out the process, which is different from that explained above, or to treat the effluent, produced by the dehalogenation, by some means other than those which have been described above specifically.

The following examples, which are given without implying a limitation, reveal the performance and advantages of the process according to the present invention.

The abbreviations used in these examples are:
TTCNB:tetrachloronitrobenzene
TTCA:tetrachloroaniline
TCA:trichloroaniline
DCA:dichloroaniline
CA:chloroaniline
PCB:pentachlorobenzene
TTCB:tetrachlorobenzene
A:aniline

EXAMPLE 1

Preparation of two fluid-bed catalysts, the support of which is obtained in accordance with the first variant.

100 g of flash alumina grains (size 20 to 100 microns), having a specific surface area of 300 $m^2/g$, are impregnated using an aqueous solution of magnesium nitrate, $Mg(NO_3)_2.6H_2O$, so as to obtain a final magnesium content of 5% by weight, relative to the finished catalyst (that is to say about 5.25% by weight, relative to the support). The impregnated support is then calcined for 3 hours at 950° C.

The same procedure is followed with another sample of alumina, which is similar to the first, but impregnation is carried out with an aqueous solution of chromium oxide ($CrO_3$), so as to obtain a final chromium content of 10% by weight (that is to say about 11.1% by weight, relative to the support). The impregnated support is then calcined under the same conditions as previously.

The catalyst is then prepared, in accordance with a conventional technique, by impregnating each of these modified supports with a solution of copper chloride, so as to obtain a final copper content of 6% by weight, relative to the "support/active phase" combination (that is to say about 6.4%, relative to the modified or unmodified support). The impregnated support is then dried at 200° C.

The catalysts thus obtained are denoted below as, respectively:
magnesium catalyst:1
chromium catalyst:2

EXAMPLE 2

Preparation of a fluid-bed catalyst, the support of which is obtained in accordance with the second variant.

A solution of chromium III oxychloride is prepared by the action of 100 cm$^3$ of 36% strength HCl (d=1.18) on 192.3 g of $CrO_3$ in the presence of a reducing agent, and this solution is mixed with a solution containing 1,243.7 g of aluminium oxychloride, $Al_2(OH)_5Cl$. The mixture is precipitated in the cold by adding it to an aqueous solution of hexamethylenetetramine. The resulting product is then dispersed as fine droplets in petroleum at 90° C., using a pump and a nozzle of appropriate diameter.

By varying the output of the pump and the diameter of the nozzle, it is possible to adjust, as desired, the particle size distribution of the droplets formed. The latter coagulate in the hot petroleum, assuming a spherical shape.

After heating for 21 hours at 100° C. in the petroleum bath, the microbeads are separated off, washed with water, dried for 12 hours at 100° C. and then calcined for 4 hours at 900° C., so as to lead to the formation of a "chromium oxide/alumina" solid solution.

This support is then impregnated, using a solution of copper chloride, by means of a conventional technique (coating kettle) and then dried at 200° C.

The catalyst obtained, which contains 10% of chromium and 6% of copper, will be denoted by 3.

EXAMPLE 3

100 g of vaporised 2,3,4,5-tetrachloronitrobenzene and 75 liters of hydrogen are introduced, in the course of 1 hours, through the bottom of a tubular reactor filled with 100 g of grains of catalyst having a modified support according to the first variant of the invention (compare, for example, size: 20 to 100 microns). The temperature in the reactor is of the order of 310° C. and is kept essentially constant by cooling with a heat-transfer fluid.

The contact time of the mixture of gases with the catalyst is 3 seconds. The whole operation takes about 4 hours. From the top of the dehalogenation zone, the reaction effluent passes into a column for washing with water; the latter carries the anilines and the HCl down, whereas the surplus hydrogen is discarded to the atmosphere. The mixture recovered at the bottom of the washing column is then neutralised with sodium hydroxide in order to liberate the organic part which is analysed by vapour phase chromatography and thin layer chromatography.

The results of this analysis are shown in the following table in the form of the proportions of the various effluents, expressed as a molar percentage.

By way of comparison, the results are given for an operation which is carried out under the same conditions with a catalyst R, having an unmodified support, as described in French Application No. 2,162,782.

| Catalyst Effluent | conventional R | according to the invention 1 | according to the invention 2 |
|---|---|---|---|
| 2,3,4,5-TTCNB | 1.0 | 2.3 | 0.2 |
| 2,3,4,5-TTCA | 12.2 | 22.5 | 21.7 |
| 3,4,5-TCA | 1.0 | 3.4 | 2.0 |
| 2,3,4-TCA | | 1.3 | |
| 2,3,5-TCA | 36.2 | 33.3 | 35.7 |
| 3,4-DCA | | 1.1 | |
| 3,5-DCA | 42.3 | 33.1 | 32.0 |
| 3-CA | 7.3 | 2.7 | 8.4 |
| Carbon (deposit on catalyst) % | 9.0 | 5.1 | 3.2 |

This table clearly shows the important reduction in the level of carbon deposited on the catalyst with a modified support according to the invention, which reduction makes it possible to considerably extend the lifetime of the support. The yield of 3,5-dichloroaniline is lower than that obtained with the catalyst having a conventional support, but this is only a minor disadvantage because, in industrial operation, the unconverted gases can be recycled and because it becomes cheaper to regenerate the catalyst.

EXAMPLE 4

The procedure of the preceding example is followed, using the catalyst having a modified support according to the second variant of the invention (catalyst No. 3), compared with a catalyst R, having an unmodified support, as described previously. The results obtained are included in the following table:

| Catalysts Effluents | R | 2 | 3 |
|---|---|---|---|
| 2,3,4,5-TTCNB | 0.3 | 0.1 | 0.2 |
| 2,3,4,5-TTCA | 8.2 | 20.2 | 18.3 |
| 3,4,5-TCA | 1.0 | 1.6 | 2.9 |
| 2,3,5-TCA | 30.4 | 29.4 | 30.6 |
| 3,5-DCA | 37.3 | 32.0 | 32.5 |
| 2,5-DCA | 2.2 | | |
| 3-CA | 2.7 | 5.6 | 5.5 |
| PCB | 0.5 | | |
| TTCB | 0.3 | | |
| C % on catalyst | 8.0 | 3.2 | 2.6 |
| % of catalyst worn away per hour in a comparison test (standard) | 8 | 6 | 2 |

This table clearly shows:

The reduction by two-thirds, which is therefore considerable, in the carbon deposit on the catalyst, brought about by the modified support 3 (chromium oxide/alumina microbeads), relative to the unmodified support.

The significant improvement in limiting the degradation of the catalyst by attrition due to the mixing (by the gaseous reactants) of the catalyst bed.

EXAMPLE 5

The procedure of Example 3 is followed using catalyst 2, except that equal volumes of vaporised, 3,4-dichloroaniline and of hydrogen, in a molar ratio of $H_2$/3,4-DCA of about 5, are introduced into the reactor. The reaction is carried out for 3 hours at 320° C. with a residence time of 3 seconds.

The results under these conditions are recorded in the following table, again expressed as a molar percentage:

| Effluents | mol % |
|---|---|
| 3,4-DCA | 1.4 |
| 3,5-DCA | 0.49 |
| 3-CA | 89.32 |
| A | 8.7 |
| % on the catalyst | 3.83 |

This table clearly shows the value of the process which enables a virtually complete conversion of 3,4-dichloroaniline into 3-chloroaniline.

We claim:

1. Process for the dehalogenation of halogen-containing aromatic amines, which leads to the preferential production of derivatives carrying a smaller number of halogen atoms, at least one of which is substituted in the meta position relative to the amino group, in the vapour phase and at a temperature of between 280° and 420° C., by the action of hydrogen in the presence of a controlled-action hydrogenation catalyst deposited on an alumina-based support, wherein the support used is modified, at least on the surface, by the incorporation of a metal in the form of a salt or an oxide, this incorporation consisting in treating the support with the said metal salt or metal oxide and then carrying out a calcination at a temperature ranging from about 500° to 1,000° C.

2. Process according to claim 1, wherein the support modified in this way contains from 0.2 to 30% by weight of incorporated metal, relative to the initial support.

3. Process according to claim 2, wherein the support modified in this way contains from 5 to 20% by weight of incorporated metal, relative to the initial support.

4. Process according to claim 1, wherein the metal incorporated is chosen from the group consisting of alkali and alkaline earth metals, iron, nickel, cobalt, zinc copper, chromium, molybdenum and tungsten.

5. Process according to claim 4, wherein the metal incorporated in the support is magnesium.

6. Process according to one of claims 1 to 5, wherein the active phase of the catalyst is copper.

7. Process according to one of claims 1 to 5, wherein the active phase of the catalyst is silver.

8. Process according to claim 1, wherein the support is treated with the metal salt or metal oxide by impregnating alumina using the said metal salt or metal oxide.

9. Process according to claim 1, wherein the support is treated with the metal salt or metal oxide by mixing an aluminium salt with a metal salt, shaping the mixture, gelling it by neutralising the resulting compound, and dispersing it as fine spherical droplets in a hot hydrocarbon.

10. Process according to claim 1, wherein the treated support is calcined at a temperature ranging from about 800° to 1,000° C.

11. Process according to claim 1, wherein the initial aromatic amines, containing several halogen atoms, are anilines containing two, three or four halogen atoms on the phenyl nucleus.

12. Process according to claim 11, wherein the halogen atoms are chlorine atoms.

13. Process according to claim 1, wherein the initial aromatic amines, containing several halogen atoms, are prepared in situ by introducing, into the dehalogenation zone, the aromatic nitro compounds, containing several halogen atoms, which are used to obtain the said amines.

14. Process according to claim 1, wherein the unconverted initial amine or halogenoamines produced by the reaction are recycled, in whole or in part, into the reaction zone.

15. Process according to claim 1, wherein the gaseous effluent produced by the reaction is brought into contact with a liquid or vapour which is at a substantially lower temperature than the said effluent.

16. Process according to claim 15, wherein the liquid or vapour is water or an organic solvent.

* * * * *